Figure 1:
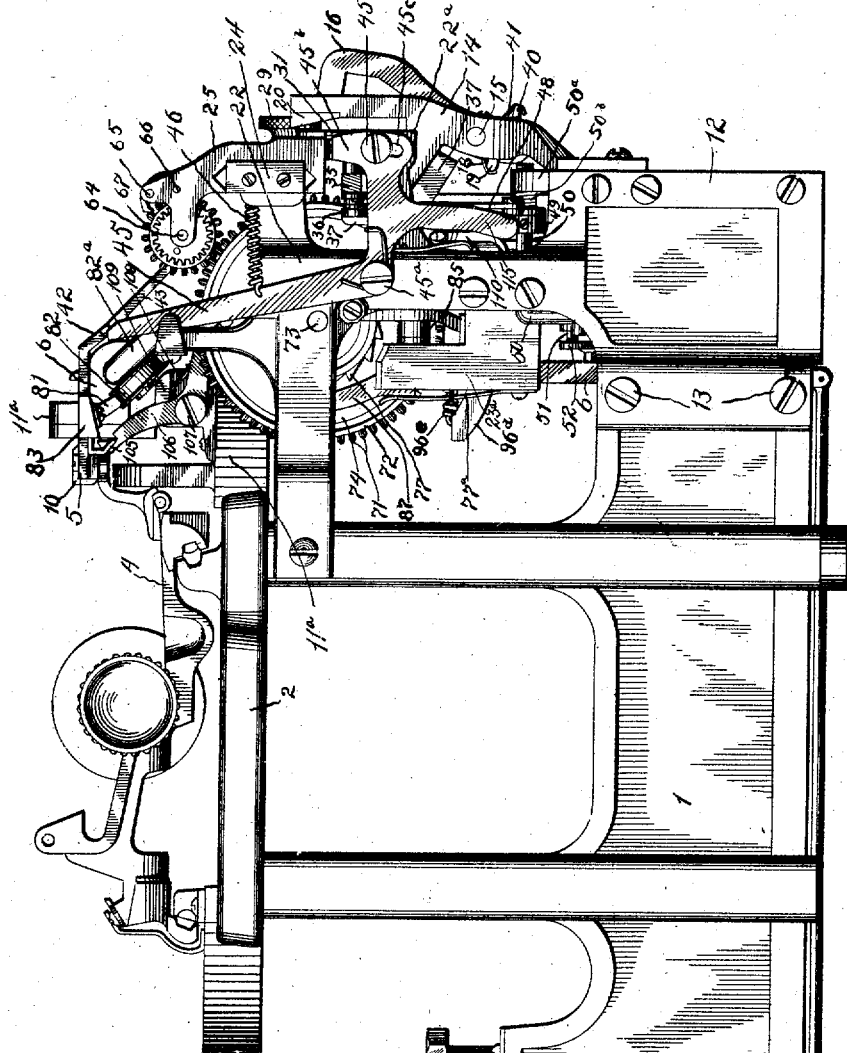

No. 888,598. PATENTED MAY 26, 1908.
H. C. DUNGAN & J. M. HUCKINS.
CALCULATING ATTACHMENT.
APPLICATION FILED JULY 8, 1905.

11 SHEETS—SHEET 1.

WITNESSES:
Carl Stoughton
M. B. Schley

INVENTORS
Harry C. Dungan
James M. Huckins
By
Shepherd & Parson
ATTORNEYS

No. 888,598. PATENTED MAY 26, 1908.
H. C. DUNGAN & J. M. HUCKINS.
CALCULATING ATTACHMENT.
APPLICATION FILED JULY 8, 1905.

11 SHEETS—SHEET 9.

WITNESSES:
Carl Stoughton

INVENTOR
Harry C. Dungan
James M. Huckins
BY
ATTORNEYS

No. 888,598. PATENTED MAY 26, 1908.
H. C. DUNGAN & J. M. HUCKINS.
CALCULATING ATTACHMENT.
APPLICATION FILED JULY 8, 1905.

11 SHEETS—SHEET 10.

WITNESSES:
Carl Stoughton

INVENTOR
Harry C. Dungan
James M. Huckins
BY
ATTORNEYS

No. 888,598. PATENTED MAY 26, 1908.
H. C. DUNGAN & J. M. HUCKINS.
CALCULATING ATTACHMENT.
APPLICATION FILED JULY 8, 1905.
11 SHEETS—SHEET 11.
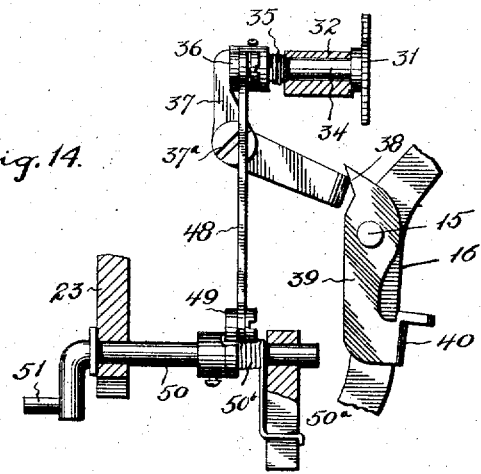
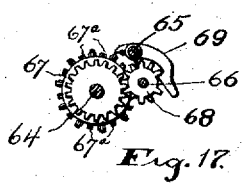
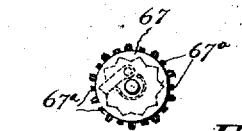
WITNESSES:
Carl Stoughton
INVENTOR
Harry C. Dungan
James M. Huckins
BY
ATTORNEYS

UNITED STATES PATENT OFFICE.

HARRY C. DUNGAN, OF JACKSON, AND JAMES M. HUCKINS, OF SPRINGFIELD, OHIO; SAID HUCKINS ASSIGNOR TO EDWIN JONES, OF JACKSON, OHIO.

CALCULATING ATTACHMENT.

No. 888,598.    Specification of Letters Patent.    Patented May 26, 1908.

Application filed July 8, 1905. Serial No. 268,875.

*To all whom it may concern:*

Be it known that we, HARRY C. DUNGAN and JAMES M. HUCKINS, citizens of the United States, residing, respectively, at Jackson and Springfield, in the counties of Jackson and Clark, respectively, and State of Ohio, have invented certain new and useful Improvements in Calculating Attachments, of which the following is a specification.

This invention relates to new and useful improvements in calculating attachments for typewriters and the like.

The object of the invention is to provide a device which may be readily attached to any standard make of typewriter without materially altering the construction of the same, and which when so attached may be operated by the numeral keys of the typewriter and properly positioned to make the correct calculation by the tabulating mechanism commonly employed on modern typewriters.

It is further contemplated in the production of this invention to provide a simple motor for operating the numeral wheels and also to cause said motor in operating to slightly overthrow the numeral wheels, thereby assuring that the latter are moved the required distance.

Still another feature of the invention resides in means whereby the calculating mechanism may be thrown out of operation and the typewriter manipulated in the usual manner.

Another novel feature of construction lies in the manner of attaching the device to the typewriter, whereby the parts are positioned, operated and returned to their normal positions without the manipulation of other keys, buttons or shifting devices than the ones usually manipulated in the operation of an ordinary typewriter and tabulator.

Finally the object of the invention is to provide an attachment of the character described that will be strong, durable and efficient, comparatively simple and inexpensive to produce and one in which the several parts will not be liable to get out of working order.

With the above and other objects in view, the invention consists of the novel details of construction and operation, a preferable embodiment of which is described in the specification and illustrated in the accompanying drawings, wherein—

Figure 2:
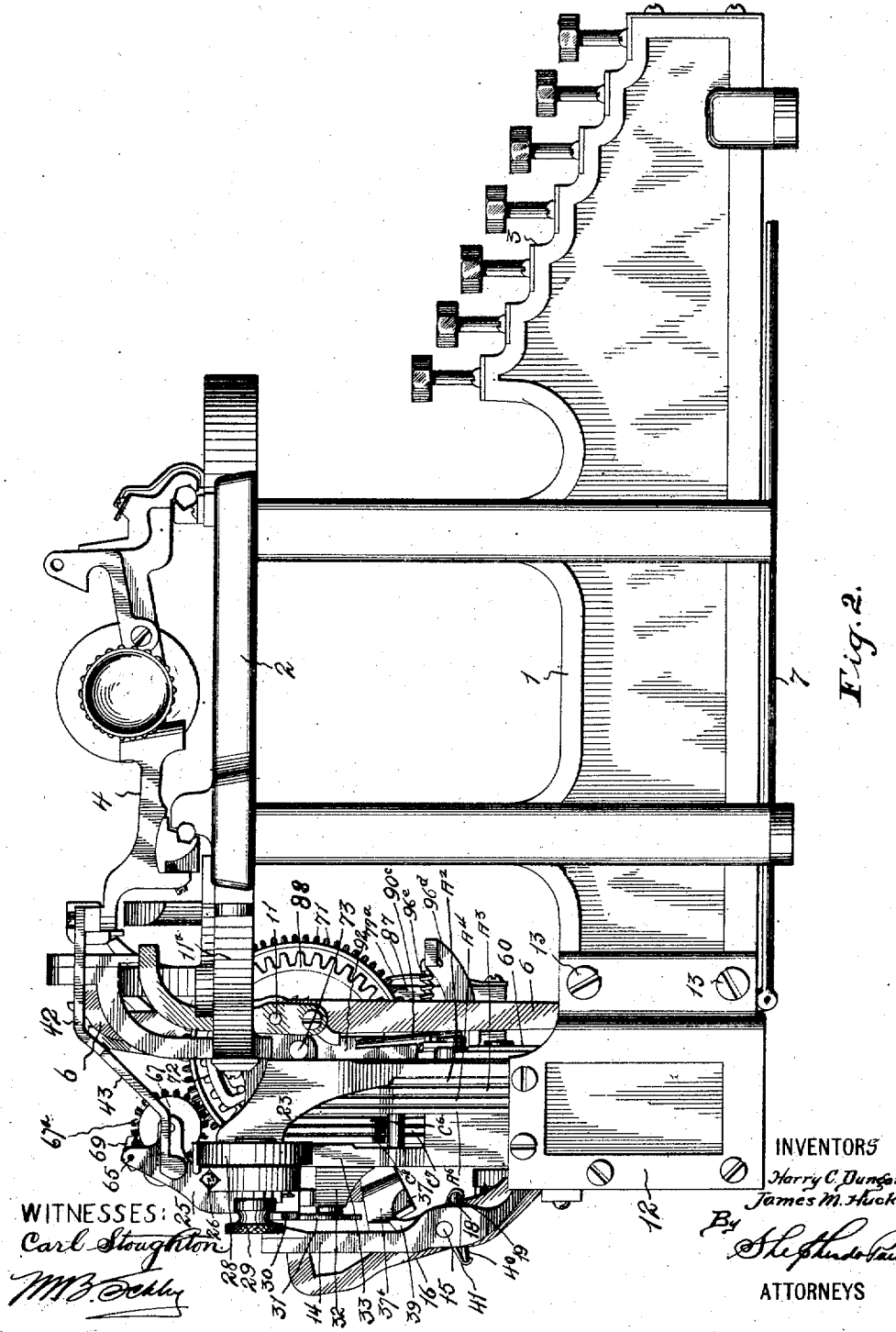
Figure 3:
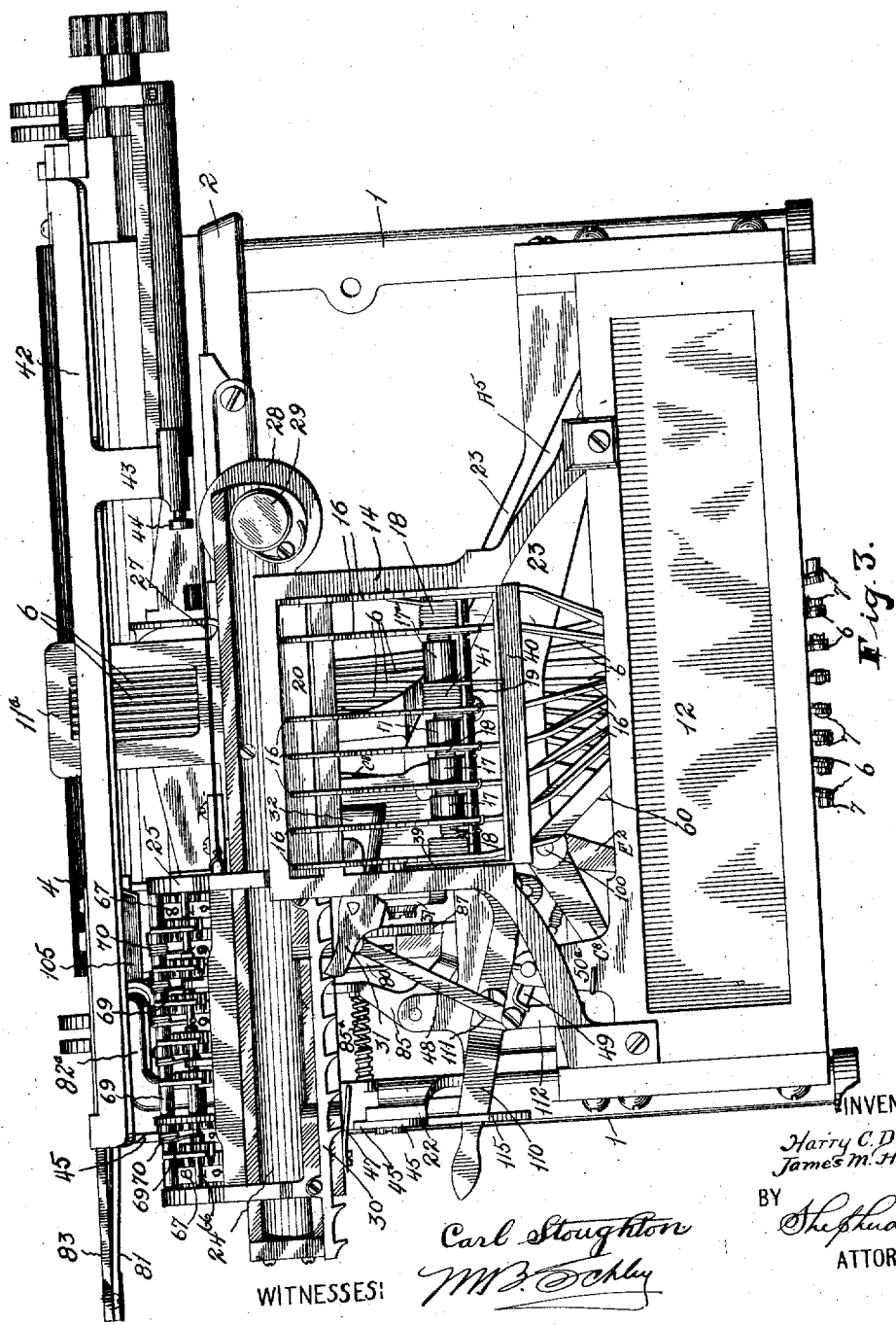
Figure 4:
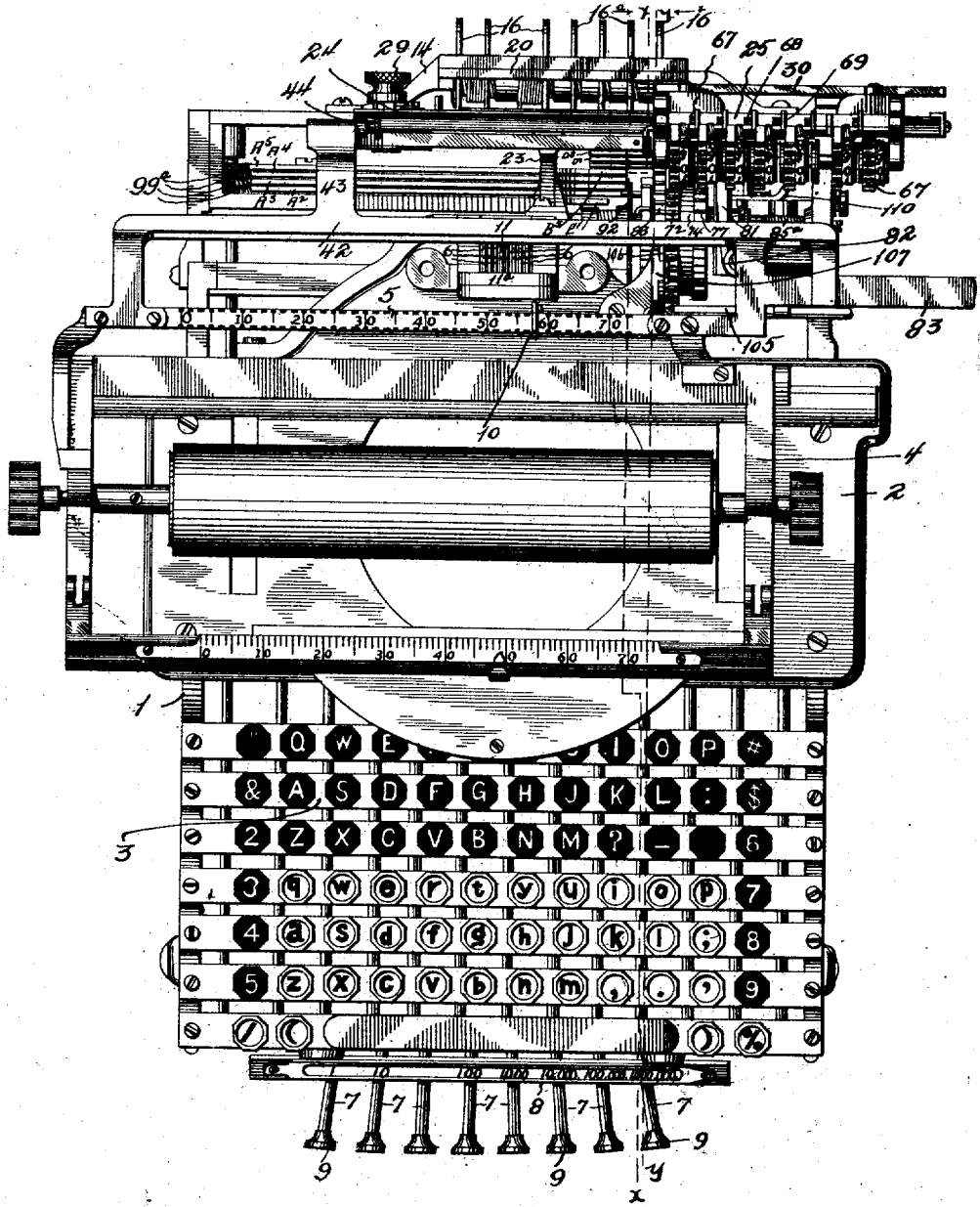
Figure 5:
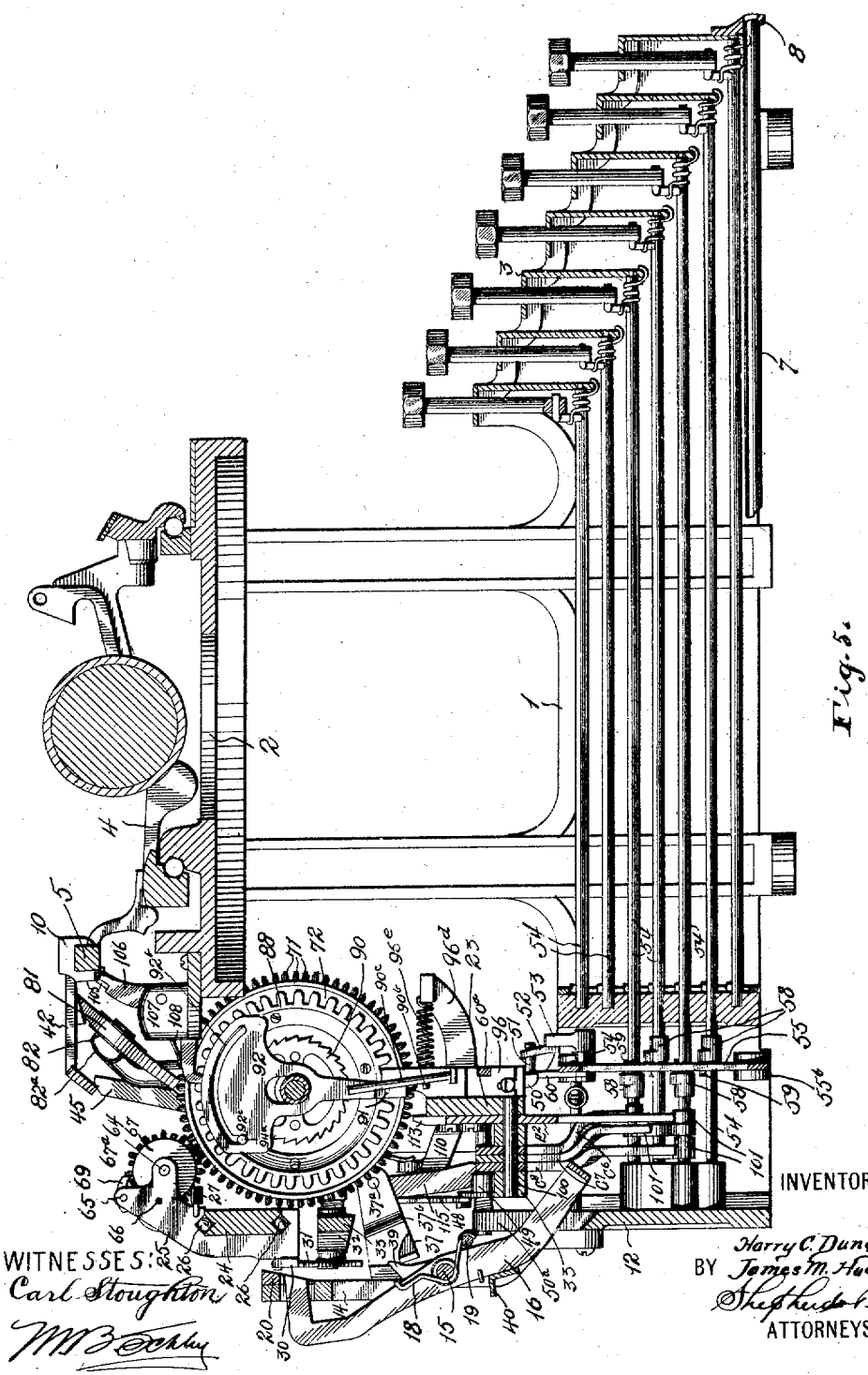
Figure 6:
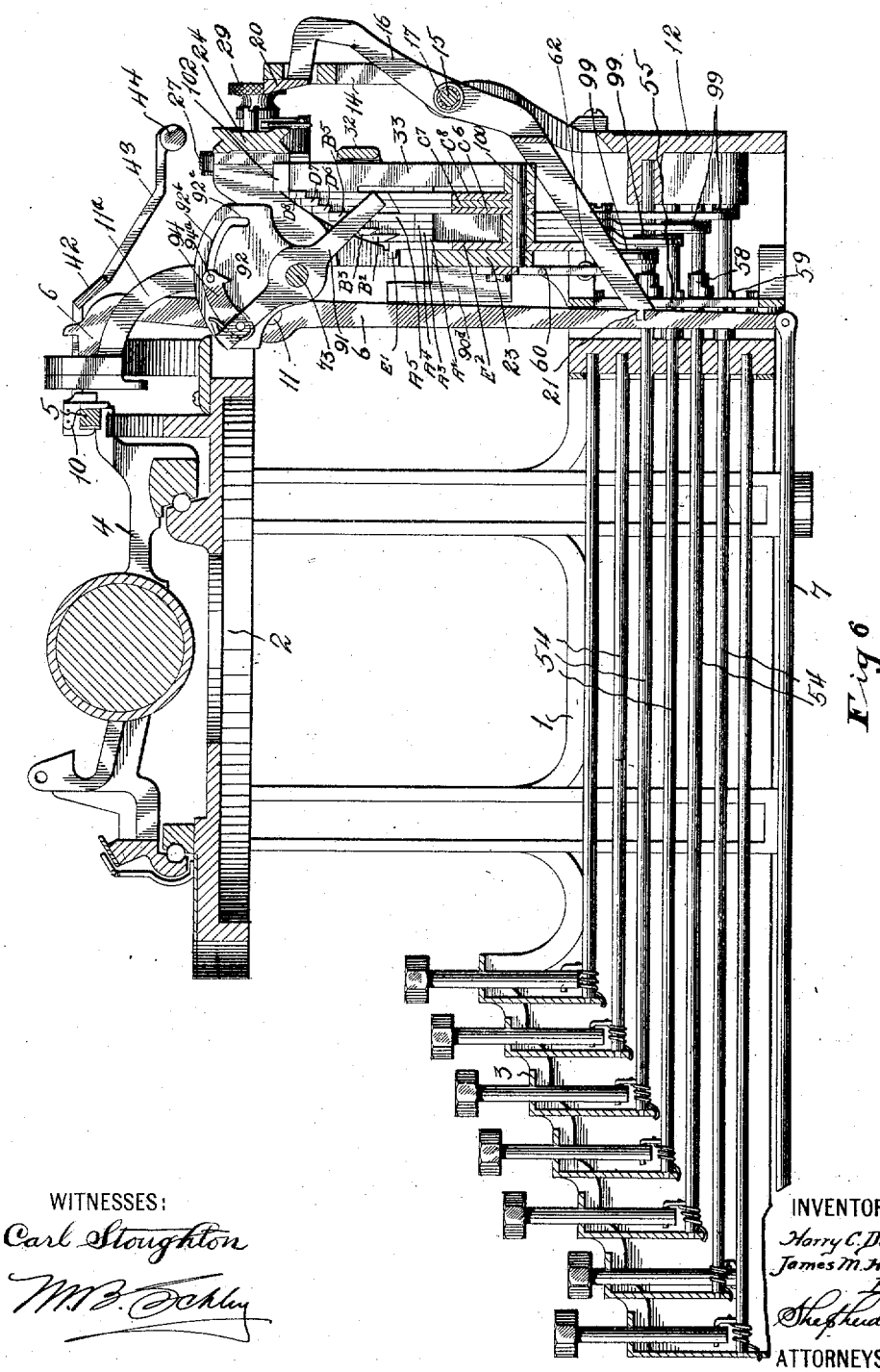
Figure 7:
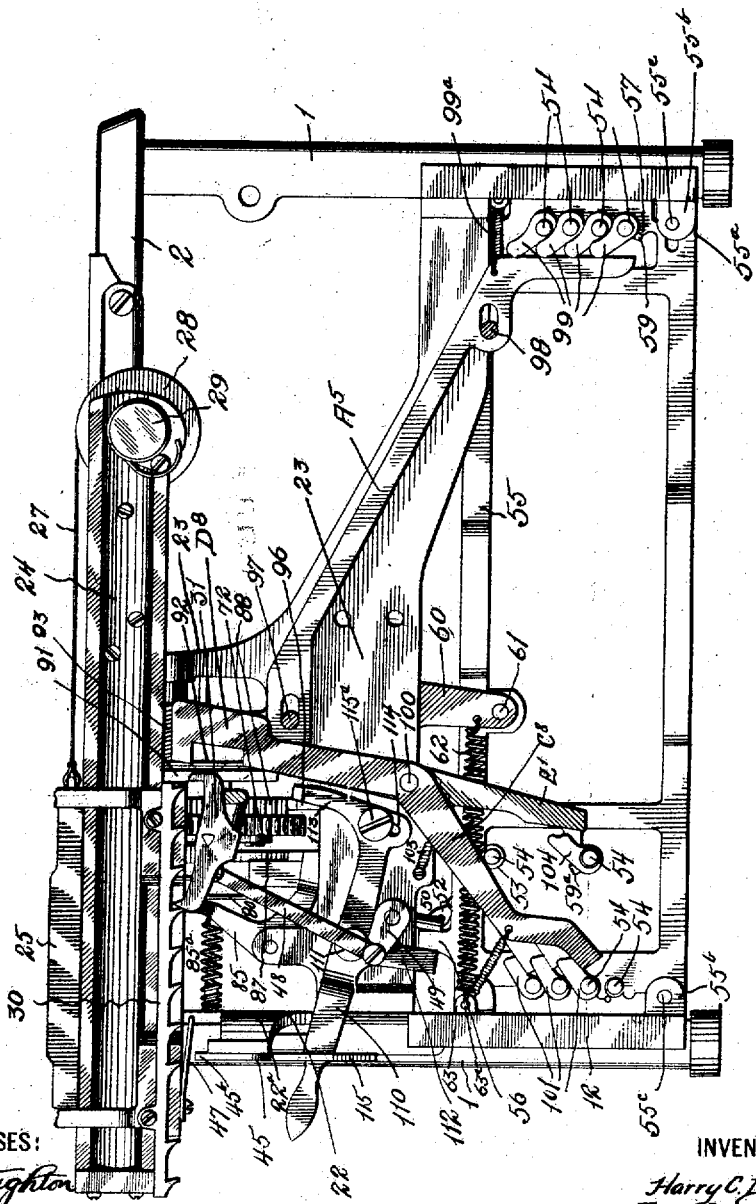
Figure 8:
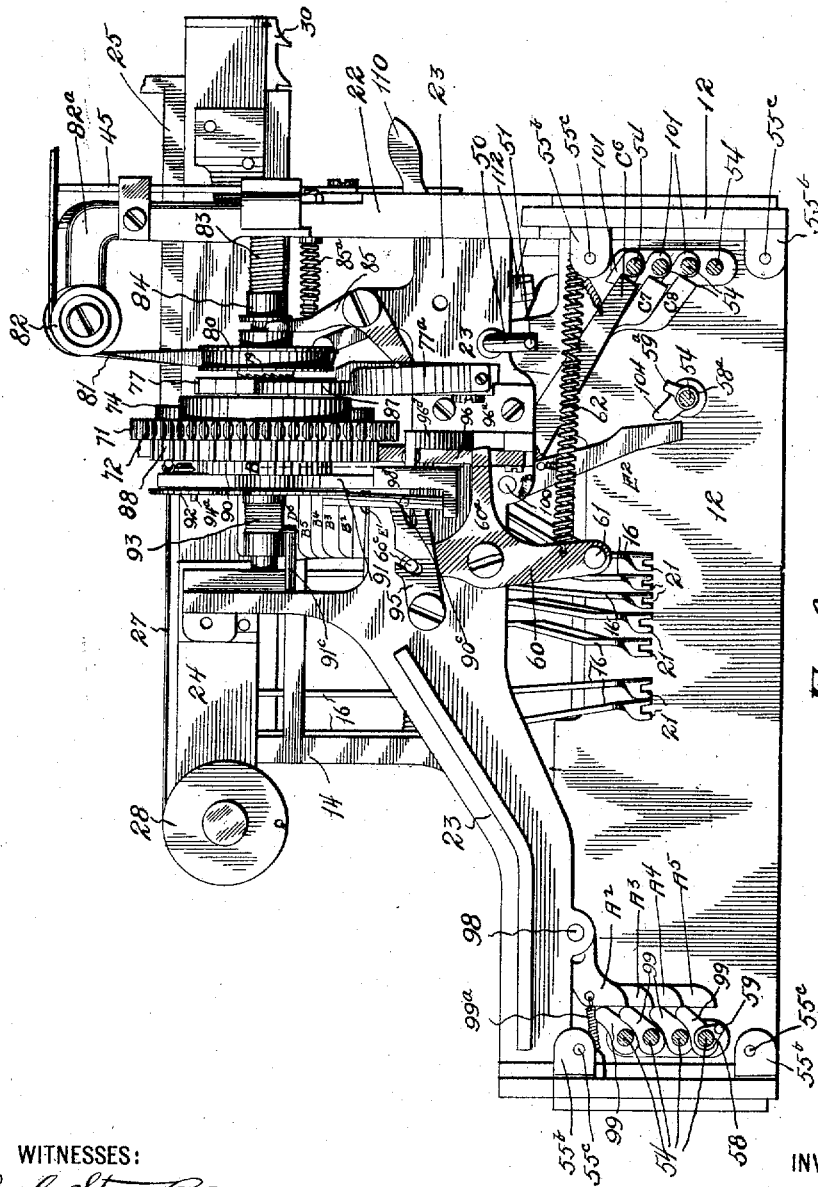
Figure 9:
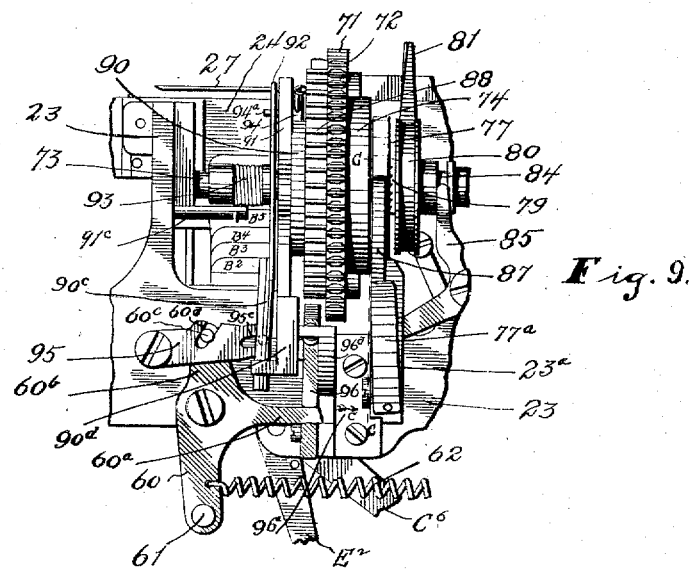
Figure 10:
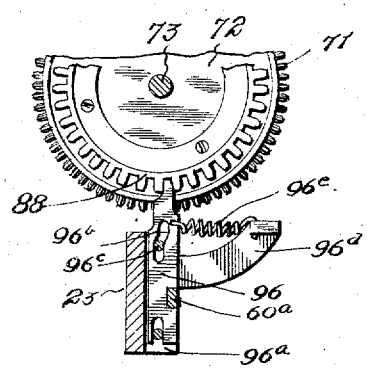
Figure 11:
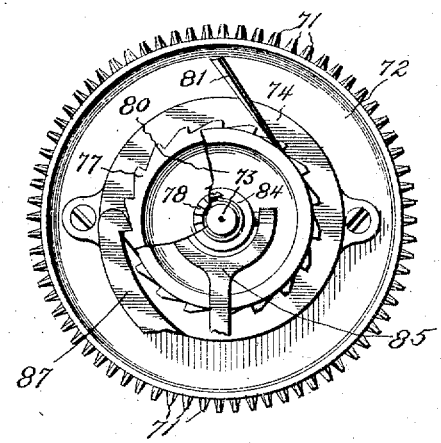
Figure 12:
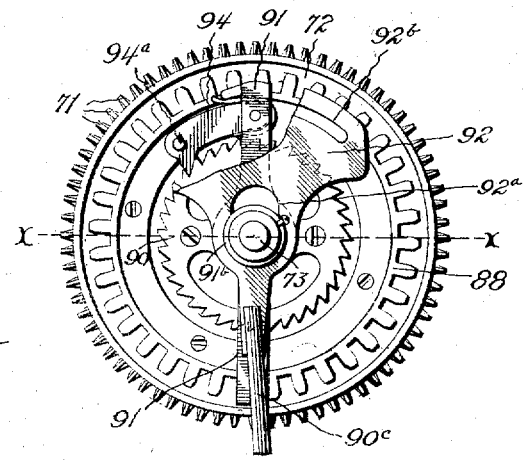
Figure 13:
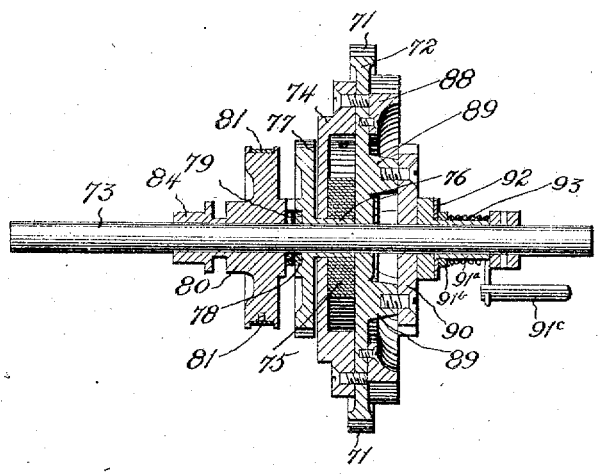

Figure 1 is a side elevation of a portion of an ordinary typewriter, showing our attachment applied thereto. Fig. 2 is an elevation of the opposite side to that shown in Fig. 1. Fig. 3 is a rear elevation of the attachment and typewriter. Fig. 4 is a plan view. Fig. 5 is a longitudinal vertical sectional view taken on the line $x$ $x$ of Fig. 4 and looking in the direction of the arrow $a$. Fig. 6 is a longitudinal vertical sectional view taken on the line $y$ $y$ of Fig. 4 and looking in the direction of the arrow $b$. Fig. 7 is a rear elevation of a portion of the typewriter frame and the attachment, the counter, stop levers and back plate of the angular frame, being removed. Fig. 8 is an inner elevation of the attachment removed from the typewriter, the counter also being omitted. Fig. 9 is an inner elevation of the motor and its winding and releasing mechanism, the latter being shown in its lowermost position and the parts released. Fig. 10 is a vertical sectional view on the line B B of Fig. 8 and looking in the direction of the arrow B. Fig. 11 is a side elevation of the motor, a portion of the winding wheel being broken away to show one of the clutch members. Fig. 12 is an elevation of the opposite side of the motor, the motor releasing plate being broken away to illustrate the motor stop arm dog. Fig. 13 is a horizontal cross sectional view of the motor taken on the line $x$ $x$ of Fig. 12. Fig. 14 is a detail side elevation of the escapement operating mechanism, showing the supports for the same in vertical section. Fig. 15 is an inner elevation of the reciprocating frame and portions of its coöperating parts, the sides of the angular frame plate being shown in vertical section. Fig. 16 is a side elevation of the tension pawl, a portion of the winding ratchet and coacting parts. Fig. 17 is a transverse sectional view taken through the counter, the carriage being omitted and the shafts shown in section, and Fig. 18 is a side elevation of one of the numeral wheels showing its pawl and ratchet construction in dotted lines.

In illustrating the invention, we have shown the attachment applied to what is commonly known as a Smith Premier typewriter, but it is to be understood that the attachment may be applied to any of the well known standard machines.

In the drawings, the numeral 1 designates the main frame of the typewriter, 2 the carriage platform and 3 the key board. On the platform 2 the ordinary carriage 4 is mounted in the usual manner. Any suitable form of tabulator for causing the carriage to be moved to a predetermined point may be employed, but we prefer to use the tabulator shown in the drawings which is now being more commonly attached to typewriters, as its construction permits of its ready application without materially altering or interfering with the usual operation of the typewriter. Therefore in Fig. 4, we have shown the graduated stop bar 5 of the tabulator supported from the rear side of the carriage 4 and the tabulator stop levers 6 secured on the frame 1 in the usual manner. These levers 6 are pivotally supported on the shaft 11 (see Fig. 2) and spread apart at their lower ends, at which point they are pivotally connected to the tabulating key rods 7, the latter extending forwardly beneath the machine and supported in the usual indicating bracket 8, the said rods extending slightly forward of the bracket and carrying the keys 9 on their outer ends, as best shown in Fig. 4. On the bracket 8 the usual symbols designating the different keys are arranged over the rods 7, in the usual manner. On the tabulator bar 5 the ordinary stop piece 10 is arranged so as to engage with any one of the stop levers 6 which may be projected into its path by the depression of the tabulator key connected therewith. The tabulator stop levers 6 are pivoted on the rod 11, which is supported in the tabulator frame 11ª (see Figs. 2 and 4). It will be apparent that when one of the keys 9 is depressed or pushed inward, the lower end of its respective stop lever 6 will be swung outwardly and rearwardly, while the upper curved end of the lever will be swung inwardly and forwardly and caused to project into the path of the stop piece 10 which will abut the said lever and stop the carriage at the proper predetermined point, the carriage having been released and allowed to travel in the usual manner.

Our attachment comprises a lower angular frame plate 12, rigidly attached to the lower rear portion of the frame 1 by screws 13 at each side thereof. The frame plate 12 supports along its rear upper edge, an outwardly bent and upwardly extending bracket 14. The bracket 14 is provided about midway its height with a transverse shaft 15 on which stop levers 16 are pivotally mounted. Each of the stop levers has secured to its side, collars 17 and 17ª, the collar 17ª being considerably longer than the other collars, so as to separate the two stop levers between which it is disposed. By referring to Fig. 3, it will be apparent that the collar 17ª is arranged between the second and third stop levers from the right, thereby providing a period space, as the first two stop levers 16 from the right in the said figure, are connected to the tabulator stop levers controlled by the units and tens keys as will hereinafter be described. The collars are fixed to the stop levers and encircle the shaft 15. Between the end of each collar and the side of the next adjacent stop lever, a coiled spring 18 is confined on the shaft 15. One end of each spring is engaged about the inner edge of the stop lever, while the opposite end is caught about a yoke 19 passing across the inner edges of the levers and connected at its ends to the frame 14, as shown in Figs. 1, 2, 5 and 6. As the ends of the springs engage with the stop levers above and below the shaft 15 on which they are pivoted, the same are normally forced outward as shown in Fig. 5. The upper ends of the stop levers are bent sharply at an angle and project inwardly through a slotted guide plate 20 secured in the upper end of the frame 14. The stop levers 16 project inwardly at their lower ends and are bent so as to converge toward each other. The extreme lower ends of the stop levers 16 are slightly bent and bifurcated as indicated at 21 in Figs. 6 and 8. There being as many stop levers 16 as there are tabulator stop levers 6, the bifurcated ends 21 of the former are engaged about the rear side of each of the said tabulator levers. In this manner when one of the tabulator keys is depressed and its stop lever 6 swung rearward at its lower end, the stop lever 16 connected to the stop lever 6 will also be swung rearward at its lower end, causing it to be rocked on the shaft 15 against the tension of its respective spring 18 and its inner end swung inward beyond the inner face of the guide plate 20. When pressure is relieved on the tabulator key and the tabulator stop lever swung back to its normal position, the spring 18 will swing the stop lever 16 to its normal position. Supported between the frame 14 and the tabulator frame 11ª on brackets 22 and 23 and projecting upwardly from the angular frame plate 12, is a double grooved rail 24 which extends some distance to the left across and beyond the frame 14 as shown in Fig. 3. About the rail 24 we arrange a counter carriage 25 suitably supported on ball bearings 26 as shown in Fig. 5. To the right hand end of the counter carriage 25 referring to Fig. 3, we attach the end of a thin metallic tape 27 which passes about a suitable spring drum 28 mounted on the inner end of the rail 24 as shown in the said figure. The spring drum 28 may be of any approved construction and is provided with a winding knob 29 by which it may be maintained at the desired tension. This drum acts to wind up the tape 27 and draw the counter carriage along the rail when the carriage is released, the returning of the carriage and the unwinding of the tape serving to rewind the drum. Secured on the lower rear side of the counter carriage 25 is a toothed escapement bar 30 which is adapted to be engaged by the escapement 31, the latter being pivotally supported in an arm 32 projecting from an angular extension 33 of the bracket 23, as shown in Fig. 14. The escapement 31 is fixed on the end of a rock shaft 34 mounted in the arm 32. A spring 35 is confined on the shaft 34 between the inner side of the arm 32 and a crank arm 36 secured on the inner end of the shaft. The spring 35 serves to normally hold the escapement against the arm 32, but to allow the shaft 34 to be moved longitudinally to force the escapement out of line with the toothed escapement bar 30. This movement of the shaft and escapement is accomplished by means of a bell crank lever 37 pivoted on the screw 37$^a$ which is supported on the end of an arm 37$^b$ mounted on the inner side of the frame 14 (see Fig. 5), the said bell crank having its upper end bearing against the crank arm 36 as shown in Fig. 14 and its lower end bent at right angles and bearing against the inclined face 38 of a bridle arm 39, as shown in Figs. 2, 3 and 14. The bridle arm 39 forms a part of a U-shaped bridle 40 passing across the rear side of the stop levers 16 and pivotally supported on the shaft 15 as clearly shown in Fig. 3. The bridle is yieldably held in contact with the stop levers by a spring 41 coiled about the elongated collar 17$^a$ and having one of its free ends in engagement with the bridle and its other free end caught about the yoke 19 in substantially the same manner as the coiled springs 18, thus when one of the stop levers 16 is manipulated the bridle will be swung outwardly causing its arm 39 to be rocked on the shaft 15 and the bell crank 37 also rocked and its upper end swung inward.

The upper end of the bell crank bearing against the crank arm 36 as described, moves the shaft 32 longitudinally against the tension of the spring 35, thus forcing the escapement out of line and engagement with the escapement bar 30; the counter carriage 25 thus being released is drawn by the tape 27 until the end of the escapement bar encounters the upper end of the stop lever 16 which has been projected into its path. The counter frame is thus simultaneously positioned with the typewriter carriage 4 by the depression of any one of the tabulator keys 9. When pressure is relieved on the tabulator key and the stop levers 6 and 16 swung to their normal positions in the manner described, the bridle will be returned to its original position by the spring 41 and the spring 35 allowed to draw the escapement back into line with the escapement bar 30 with which it will engage and thus hold the carriage at the point to which it has been moved. For returning the counter carriage 25 to its normal position, we mount on the tabulator bar 5 a U-shaped bar 42 having its rear side disposed at an angle from which a fixed arm 43 projects downwardly. The arm 43 carries a horizontally disposed headed pin 44 which is adapted to engage with the side of the counter carriage and move the same along the rail 24 when the operator moves the typewriter carriage 4 back to its starting point in the usual manner. This returning of the counter carriage unwinds the tape 27, thus rewinding the spring drum 28 hereinbefore referred to. As the carriages are returned, the inclined portion of the bar 42 engages with the upper end of an angular lever 45 pivotally mounted on a screw 45$^a$ (see Fig. 1) supported in the vertical bracket 22. The lever 45 is formed at its rear end with a vertical lug 45$^b$ and a curved slot 45$^c$ through which a screw 45$^d$ is loosely passed and driven into an extension 22$^a$ of the bracket 22. The lug 45$^b$ is normally held depressed by a coiled spring 46 engaging with the lever 45 above its pivot point and fastened to the bracket 22. The movement of the lever is limited by the slot 45$^c$ and its upper end is thus held in position to be readily engaged by the bar 42. As the end of the said bar encounters the lever 45, the same is rocked and its lug 45$^b$ swung upward so as to engage the underside of a downwardly bent leaf spring 47 mounted on the underside of the counter carriage, which spring will ride along the upper edge of the lug and drop behind the same when the carriage has reached its starting point, thus locking the same against travel. When any of the tabulator keys are manipulated to move the carriages, the bar 42 rides off the upper end of the lever 45, thus allowing the spring 46 to rock the lever and swing its lug 45$^b$ downward out of the path of the leaf spring 47, thereby releasing the carriage.

As is obvious the more essential purpose of the escapement 31 is to impart to the counter carriage, an intermittent or step by step movement, therefore for the purpose of rocking the escapement so as to cause it to be moved into and out of engagement with the teeth of the rack bar 30, we loosely attach to the crank arm 36 a link 48 pivotally connected at its lower end to a second crank arm 49 secured on a crank shaft 50 mounted in the bracket 23 and a bearing lug 50$^a$ projecting upwardly from the rear plate 12 as clearly set forth in Fig. 14. A spring 50$^b$ coiled about the crank shaft 50 and having its free ends engaged with the crank arm 49 and bearing lug 50$^a$ acts as a tension device to force the crank arm upward and hold one end of the escapement in contact with the escapement bar. The crank shaft 50 projects through the bracket 23 and carries on its downturned end a horizontally projecting pin 51 which engages in a loop 52 pivoted on a rock arm 53 (see Figs. 5 and 7). The rock arm is secured on the end of the rock shaft 54 connected to the letter O key of the typewriter, the said shaft 54 having been extended through the rear of the main frame 1, thus when the O key which serves for the symbol zero, is depressed, the shaft 54 is rocked in the usual manner, swinging the rock arm 53 downward which in turn pulls the loop 52 also downward. The loop 52 being connected to the pin 51 rocks the crank shaft or swings it to the right, reference being had to Fig. 7. The movement thus imparted to the crank shaft 50 is transmitted to the crank arm 49, which being swung downward causes the crank arm 36 to be swung downward through the agency of the link 48 and the escapement 31 thus rocked, thereby allowing the counter carriage to move one step or the distance between two teeth of the escapement bar 30.

We also provide another means for operating the escapement adapted to operate independently of the O or zero key. This mechanism comprises a substantially rectangular reciprocating frame 55 having upper and lower slotted ends 55$^a$ supported in bifurcated lugs 55$^b$ projecting inwardly from each side of the angular frame plate 12 and provided with pins 55$^c$, with which the slotted portions engage. The frame is reciprocated by means which will be hereinafter described. A lug 56 projects upwardly from the frame 55 so as to engage with the horizontal pin 51 and swing the crank shaft 50 when the frame 55 is moved to the right, operating the escapement in substantially the same manner as it is operated by the loop 52, the said loop allowing the pin 51 to be swung as will be obvious.

The frame 55 is moved in one direction by the manipulation of the typewriter keys, or that is, the keys which bear the numerals 1, 2, 3, 4, 5, 6, 7, 8 and 9; these keys are arranged on each side of the machine and are connected each to a rock shaft 54 extended and manipulated in substantially the same manner as the rock shaft 54 connected with the zero key as hereinbefore described. The frame is engaged about the rock shafts and provided with a plurality of rounded lugs 57 projecting in juxtaposition to the shafts. On each of the shafts, we mount small crank arms 58 each provided with a laterally extending pin 59 to engage with one of the lugs 57. These crank arms are disposed in staggered relation on opposite sides of the frame 55 as clearly illustrated in Figs. 5 and 6, but with their pins projecting toward each other so as to engage with the lugs of the frame. Owing to the peculiar construction of the typewriter with which we have illustrated our attachment, the rock shafts 54 connected to the numeral keys 2, 3, 4 and 5 arranged on the left hand side of the machine with reference to Figs. 4 and 15, are rocked in a direction opposite to the direction in which the rock shafts 54 connected to the keys 1, 6, 7, 8 and 9 arranged on the right hand side of the machine, thus when any one of the said keys is depressed, the frame 55 will be moved in the same direction, that is, to the left with reference to the said figure. This is caused by the fact that the lugs 57 project in the same direction and the crank arms 58 connected to the numeral keys 2, 3, 4 and 5 being swung downward and the crank arms operated by the numeral keys 1, 6, 7, 8 and 9 being swung upward. The numeral key 1 being out of line with the other keys, has mounted on its rock shaft 54 a sleeve 58$^a$ from which projects a lug 59$^a$ engaging with a rounded lug 57$^a$ similar to the lugs 57 and projecting in the same direction. The lug 59$^a$ is swung upward or moved in the same direction as the crank arms 58 on the right hand side of the machine with reference to Fig. 15. The movement imparted to the frame 55 is slight being merely enough to impart a limited rocking movement to a bell crank lever 60 to which it is connected by a stud 61 working in a slot 61 formed in the upper portion of the frame 55 as clearly shown in Fig. 15. The lower portion of this bell crank is connected with a coiled spring 62, the latter being engaged over a rod 63 supported in lugs 63$^a$ projecting inwardly from the side of the frame plate 12. This spring 62 not only serves to return the lever 60 to its normal position, but places the reciprocating frame 55 under tension and causes it to be swung to the right when the pressure on one of the numeral keys is relieved, the reciprocating frame thus getting its movement through the crank arms 58 and the spring 62.

We will now describe the general construction and arrangement of the counting or registering device mounted on the counter carriage 25. This counter device or register has been made the subject matter of a separate application filed by Harry C. Dungan, December 19, 1904, and bearing Serial Number 237,459 and therefore it will not be necessary to enter into a detailed description of the device, except as to certain improvements in the counter which have been made since filing said application. The counting or registering device comprises three shafts 64, 65 and 66 rigidly mounted in the upper portion of the counter carriage. On the shaft 64 we mount the numeral wheels 67 which beginning at the right of Fig. 4, constitute the units, tens, hundreds, thousands, tens of thousands, hundreds of thousands and millions wheels. These wheels are provided with peculiarly shaped teeth for engaging a common operating agent as set forth in the said former application. However, instead of making all the teeth about the periphery of each numeral wheel, of the same length, we propose to cut off every other tooth 67$^a$ and to position these cut off teeth between the numerals on the periphery of the wheels. All the wheels are thus formed except the first or units wheel, which has all its teeth of the same length. On the shaft 66, we mount the transfer wheels 68 which coöperate with the numeral wheels and their parts in the same manner as set forth in said previous application. The numeral wheels as brought out in said previous application, are capable of being independently operated and thus any one of the numeral wheels may be engaged with a common operating agent and additions expeditiously made. On the shaft 65 which is arranged over the shaft 66, we mount locking dogs 69, each having one end in engagement with one of the numeral wheels and its other end in engagement with one of the transfer wheels. The main purpose of these locking dogs is to prevent overthrow of the wheel of the next higher denomination when the transfer wheel is operated to, transfer an addition from the next wheel of lower denomination. By shortening or cutting off every other tooth of the numeral wheels and placing the short teeth between the figures, when one of the dogs is swung by the transfer device, its end projecting over the teeth of the numeral wheel will be swung downward not far enough to engage with the short tooth which will pass under it, but low enough to engage with the next long tooth opposite the next higher figure, thus preventing the numeral wheel from being overthrown. A coiled spring 70 engaged about each dog is connected to the transfer shaft 66 and serves to return the dogs to position after they have been swung by the teeth of the transfer wheels. The teeth of the numeral wheels are adapted to engage or slide between the teeth 71 of the motor wheel 72, the counter carriage being positioned so as to bring the proper numeral wheel into engagement with the teeth of the motor wheel and the latter released so as to revolve and turn the numeral wheel the distance required to make the proper addition.

We will now proceed to describe the construction and operation of the motor and the means for allowing the same to move the proper predetermined distance to register the correct addition.

The motor comprises a main shaft 73 which is mounted in suitable bearings in a vertical extension of the bracket 23 and the inner side of the bracket 22. The motor drive wheel 72 is loosely mounted on the shaft 73 and has secured upon one side an annular housing 74 in which is confined a flat coiled spring 75 as clearly shown in Fig. 13. The spring 75 is fastened at one end to the inner periphery of the housing and is coiled about an arbor or sleeve 76 which projects into the housing and loosely encircles the shaft 73. This arbor 76 is an integral extension of a winding ratchet 77 disposed adjacent to the housing 74 and having on its outer face an integral clutch member 78 which is adapted to be engaged by a sliding clutch member 79 formed on the adjacent face of a winding wheel 80. The winding wheel 80 has one end of a metallic tape 81 secured to its outer periphery, adapted to be wound there-about and unwound therefrom. The tape 81 is passed upward and over a guide wheel 82 supported at an incline on the end of an arm extension 82$^a$ of the bracket 22; the opposite end of the tape is secured to the underside of a bar 83 projecting from the left hand end of the U-shaped bar 42 as shown in Fig. 3. A suitable mechanism hereinafter described, operates to move the winding wheel 80 so as to throw its clutch member 79 into engagement with the clutch member 78 of the winding ratchet 77 and thus winding the spring 75 by means of the arbor 76 when the tape 81 is unwound from the winding wheel, which occurs when the carriage 4 of the typewriter is being returned to its starting point. In this manner the coiled spring is constantly wound up and sufficient power provided to operate the motor wheel under all conditions. When the spring has been fully wound, it is obvious that some provision for throwing the clutch members out of engagement must be made and we have therefore constructed certain parts, which act not only to throw the clutch members out of engagement, but to throw them into engagement when the spring has been wound to a predetermined point, when the spring 75 has been unwound to a certain degree, thus providing automatic means by which the spring is at all times maintained in working order. This mechanism is best illustrated in Figs. 8 and 16. For sliding the winding wheel 80 so as to throw the clutch members into and out of engagement, we provide the same with a grooved collar 84. In the grooved portion of the said collar, the bifurcated end of a bell crank lever 85 engages. The lever 85 is pivotally mounted in the bracket 23 as clearly shown in Fig. 8 and has its lower end engaging in the slotted offset portion 86 of a tension pawl 87, as shown in Fig. 16, the said tension pawl having its lower end slotted as indicated at 87$^a$, so as to have a slight vertical movement on a pin 87$^b$ projecting through the said slotted portion from an extension 23$^a$ of the bracket 23. The tension pawl 87 at its upper end engages with the teeth of the winding ratchet 77 and is held in contact therewith by a flat spring 77$^a$ mounted on the extension 23$^a$. The bell crank lever 85 is operated against the tension of a spring 85$^a$ which is arranged between the said lever and the bracket 22. This spring 85$^a$ is of sufficient strength to slide the winding wheel 80 and its clutch member 79 into engagement with the clutch member 78 of the winding ratchet when the spring 75 reaches its low degree of tension. The winding ratchet 77 being given a slight backward movement by the tension pawl 87, it is forced downward by the lower end of the lever 85 when the same is swung as shown in Fig. 16. The tape 81 being unwound when the typewriter carriage is returned to its starting point, the winding wheel 80 is unwound against the tension of a spring 80ª coiled about the shaft 73 and secured at one end to the grooved collar 84 and its opposite end to the bracket 22. As the tape is unwound and the winding wheel revolved, the teeth of the clutch members will engage and the winding motion imparted to the winding ratchet 77 and the spring 75 wound by the arbor 76, the pawl 87 during this action slipping over the teeth of the winding ratchet. As the typewriter carriage is moved during the writing operation, the tape 81 is wound about the winding wheel which is revolved by the spring 80ª, the teeth of the clutch members slipping over each other and the winding ratchet being held by the tension pawl 87. This relation of parts will continue until the spring 75 has been wound to its high degree so that its tension will overcome the tension or expansion of the spring 85ª when this degree is reached, the spring 75 will have a tendency to unwind, which will cause the winding ratchet to move in the opposite direction, thus pulling on the pawl 87 which having a slight vertical movement, will be drawn upward; thus through its connection with the lower end of the bell crank 85, swing the same so as to slide the winding wheel and its clutch member out of engagement with the clutch member of the winding ratchet. So long as the tension of the spring 75 is greater than the expansive force of the spring 85ª, the clutch members will be held out of engagement, but when the spring 75 is unwound and reaches its low point of tension, the spring 85ª will force the clutch members into engagement. From this description, it is thought that the winding operation will be clear.

On the opposite side of the motor wheel 72, we securely fasten a toothed locking ring 88. This locking ring is best shown in Figs. 9, 10, 12 and 13, and as is apparent leaves the central portion of the motor wheel unobstructed. Near its central portion and within the locking ring 88, the motor wheel is formed with laterally projecting bosses 89 to which is securely fastened a ratchet wheel 90 loosely encircling the shaft 73. Swingingly mounted on the shaft 73 adjacent to the ratchet 90 is a stop arm 91. The swinging arm is formed with an integral sleeve extension 91ª on which is fixed a collar 91ᵇ arranged in juxtaposition to the swinging stop arm so as to provide a narrow space for a vertically movable release plate 92. That portion of the release plate extending about the sleeve 91ª is slotted as indicated at 92ª in Fig. 12. A spring 93 is coiled about the sleeve 91ª and has its free ends secured to the collar 91ᵇ and a pin 91ᶜ projecting from the vertical extension of the bracket 23, as clearly illustrated in Fig. 9. The coiled spring is so arranged that when the stop arm 91 is released, it is swung against the tension of the said spring, thereby twisting or winding the same, so that when the said stop arm is again released the coiled spring will act to return it to its normal position. It will be apparent that the outer end of the coiled spring 75 being connected to the motor wheel through the housing 74, and the ratchet wheel 90 being connected to the motor wheel, when the parts are released, both the motor wheel and the ratchet will be rotated and for imparting motion or swinging the stop arm 91, we pivot on the outer end thereof a spring pressed dog 94 which engages with the teeth of the ratchet 90. The dog is provided with a laterally projecting pin 94ª which is adapted to travel in a curved slot 92ᵇ formed in the upper portion of the release plate 92 and normally rests in the seat 92ᶜ formed at the rear end of the said slot as set forth in Fig. 5. The ratchet 90 bearing against the dog and the dog held in position by its pin resting in the side of the slot, the motor wheel is thus held against movement. For releasing the swinging arm and the motor, we provide the bell crank lever 60 hereinbefore referred to with two arms 60ª and 60ᵇ, the latter of which carries a horizontal pin 60ᶜ as shown in Fig. 9. The pin 60ᶜ engages in an inclined slot 60ᵈ formed in the upper central portion of a lever 95 pivotally mounted on the bracket 23 and having a bifurcated end 95ª which engages about a short pin 90ᵇ projecting from the rear side of a rod 90ᶜ secured to the lower end of the release plate 92 and having its lower portion loosely supported in a guide bracket 90ᵈ arranged on the rear side of the bracket 23 as shown in Fig. 9. The bell crank lever 60 when swung by the frame 55 as before described causes the lever 95 to be swung downward by means of the pin 60ª. The lever on being swung downward through its engagement with the rod 90ᶜ draws the release plate 92 downward and the seat 92ᶜ from about the pin 94ª. The pin and thus the dog 94 being released, the motor spring 75 will be free to exert its force on the motor wheel 72 and the ratchet 90. The dog still being in engagement with the teeth of the ratchet and connected with the upper end of the arm 91 will be moved with the ratchet and the arm thus swung until its lower end engages with one of the stop bars which has been projected into its path. The movement or rotation of the motor wheel is thus governed by the distance which the stop arm swings before coming in contact with one of the stop bars which will be hereinafter described. This swinging movement of the bell crank 60 also causes its arm 60ª to be swung downward.

The arm 60ª engages with a bolt 96 arranged to move vertically on a bracket extension 96ª supported from the bracket 23 (see Fig. 10). The bolt 96 has its upper end reduced and adapted to engage between the teeth of the locking ring 88 and thus lock the motor drive wheel and parts against movement until it is moved downward by the arm 60ª which action withdraws its reduced end from the teeth of the locking ring, thereby leaving the parts free to move. When the pressure on the numeral key which has moved the reciprocating frame 55, is relieved, the spring 62 returns the frame and the bell crank to their original positions. The return movement of the bell crank, causes its arm 60ª and the lever 60ᵈ to be swung upward; this upward movement of the lever 60ᵈ raises the release plate 92 as will be apparent. The pin 94ª resting somewhere in the curved slot 92ᵇ according to the distance which the stop arm has been swung, is raised as the release plate moves upward. By this action, the dog 94 is raised out of contact with the teeth of the ratchet 90 and the arm thus released. As before described the spring 93 coiled about the extension 91 of the stop arm having been wound or twisted upon the initial movement of the arm, now serves to unwind and return the arm to its original position, the pin 94ª traveling along the slot 92 and dropping into the seat 92ᶜ, thus preventing further movement of the arm and allowing the dog 94 to again engage the teeth of the ratchet 90. As described, simultaneous with this movement the arm 60ª swinging upward, moves the bolt 96 upward. This return movement of the bolt 96 accomplishes a double function, that of locking the motor wheel against movement and at the same time imparting to the motor drive wheel a slight reverse movement. The necessity for this slight reverse movement is caused by the fact that when the drive wheel is released to move any one of the numeral wheels, it slightly overthrows the same, so as to assure the proper movement of the said numeral wheel. It will therefore be apparent that some means to offset the slight overthrow must be provided. This movement of the drive wheel 72 is accomplished by providing the bolt 96 with an offset slot 96ᵇ through which projects a pin 96ᶜ. A curved arm 96ᵈ projects upwardly from the extension 96ª and supports the end of a coiled spring 96ᵉ which is connected to the bolt 96 as shown in Fig. 10. When the bolt is forced downward, the offset slot and pin cause it to be moved toward the bracket 23 against the tension of the spring 96ᵉ so that when the bolt is forced upward, its reduced end enters between the extreme ends of the teeth of the locking ring; the spring 96ᵉ acting with the offset slot imparts a slight lateral movement to the bolt, thus causing it to impart a slight reverse movement to the locking ring and drive wheel as it completes its upward movement. This movement is very slight, merely enough to offset the overthrow.

From the foregoing it will be obvious that by varying the distance which the stop arm 91 swings, the relative movements of the motor drive wheel 72 may be varied and thus the revolving of the numeral wheels controlled. For this purpose we arrange between the angular extension 33 and the bracket 23 a horizontal rod 97 which supports the horizontal or laterally moving slotted portions of stop bars A², A³, A⁴ and A⁵. These stop bars are arranged on the same side of the typewriter as the numerals 2, 3, 4 and 5; the stop bar A² being arranged to be operated by the numeral 2 key, the stop bar A³ being adapted to be operated by the numeral 3 key and so on. Each stop bar is provided near the lower end of its downwardly inclined portion with a slotted portion engaging about a suitable pin 98 projecting from the bracket 23. The bars are thus slidingly or reciprocatingly supported on the pin 98 and rod 97. For holding the stop bars in position, light springs 99ª are interposed between the lower ends of the stop bars and the sides of the angular frame 12. Each of the stop bars is provided with a downturned foot portion of different lengths, so as to terminate in juxtaposition to cams 99 mounted on the rock shafts 54 (see Figs. 6, 7 and 8.) The cams rest in contact with the foot portions of the stop levers so that referring to Fig. 8, when one of the numeral keys from 2 to 5 inclusive is depressed, the cam mounted on its respective shaft will be rocked downward and bearing against its stop bar will move the same to the right and against the tension of its spring 99, so that the stop bar will be returned to its normal position when pressure on the numeral key is released. On their upper ends the stop bars carry upwardly extending right angular stops B², B³, B⁴ and B⁵ as illustrated in Figs. 4 and 6. The stops are stepped so that the laterally projecting portion of one is a step higher than the next lowest one. The stop B² is formed on the stop bar A² which is connected to the numeral 2 key, while the stops B³, B⁴ and B⁵ are connected to the 3, 4 and 5 numeral keys respectively. Therefore the higher the denomination of the numeral key depressed, the higher the stop projected. These stops are projected into the path of the swinging arm 91, the lower end of which arm is adapted to engage with the underside of the laterally projecting portion of the stops, each of which portions are inclined so as to make a perfect contact. It will be obvious that the $B^5$ stop (see Fig. 6) being higher up than the $B^2$ stop, the arm 91 will move a greater distance when allowed to swing to the stop $B^5$, than when the stop $B^2$ is projected into its path. The stops being thus graduated or stepped, the movements of the motor parts are controlled to a predetermined degree. For taking care of the numerals 1, 6, 7, 8 and 9, we provide different constructions. For the numerals 6, 7 and 8, we provide stop bars $C^6$, $C^7$ and $C^8$ pivoted on a shaft 100 extending between the lower end of the angular extension 33 and the bracket 23 as illustrated in Fig. 6. These swinging stop bars are slightly bent and have an angular shape, their lower portions terminating in juxtaposition to cams 101 mounted on the rock shafts 54 connected with the 6, 7 and 8 numeral keys; the swinging stop bar $C^6$ being connected with the numeral 6 key, the swinging stop bar $C^7$ with the numeral 7 key and the swinging stop bar $C^8$ with the numeral 8 key. At their upper ends the swinging stop bars are provided with stops $D^6$, $D^7$ and $D^8$, substantially the same as the stops $B^2$, $B^3$ etc. For the numeral 9, we provide a fixed stop 102 projecting laterally into the path of the swinging arm from the upper end of the extension 33 (see Fig. 6). This fixed stop as will be apparent, is arranged one step higher than the stop $D^8$ which is controlled by the numeral 8 key. At the lower end of the bank of stops, we arrange a stop $E^1$ projecting forwardly from the upper end of a pivoted stop lever $E^2$ pivoted on the rod 100. The stop lever is connected below its pivot point with a spring 103 secured to the bracket 23 as shown in Fig. 7, while its lower end terminates in juxtaposition to a rocker cam 104 secured on the rock shaft 54 connected to the numeral 1 key. The stop $E^1$ being the first of the bank and nearest to the lower portion of the stop arm 91, when projected into the path of the said arm, will allow the arm to move only a slight distance or sufficient to permit the motor drive wheel to revolve the numeral wheel with which it has been engaged, one digit or figure, while should the numeral 5 key of the typewriter be depressed causing the stop bar $A^5$ to project its stop $B^5$ into the path of the swinging arm, the motor drive wheel will be permitted to revolve the numeral wheel with which it is engaged five figures or digits, thus adding or registering 5.

For the purpose of locking the motor against operation until the typewriter carriage 4 has traveled a portion of its movement, we support from the right hand end of the typewriter bar 5 (see Fig. 4) and the bar 83, an angularly disposed plate 105 which is adapted to engage the upper end of a bell crank locking lever 106 when the carriage has been moved to the point at which it is desired to begin registering the figures set down. This locking lever is pivotally supported on a bracket 107 mounted on the tabulator frame $11^a$ and has its lower end normally engaging in the teeth of the locking ring 88 as clearly shown in Fig. 5. A flat spring 108 bearing on the lower portion of the said locking lever, holds it in the position just described, while a lug 109 formed on the bracket 107 is abutted by the upper arm of the lever, thus preventing the said lever from being swung too far downward. When the upper end of the lever is engaged by the plate 105, it is depressed so that its lower end is raised out of engagement with the locking ring against the tension of the spring 108 and leaving the motor free to be operated. When the bar 105 is moved out of engagement with the locking lever, the spring 108 serves to throw the same into engagement with the locking ring 88 and thus lock the motor against movement. From the foregoing, it will be apparent that the operator is enabled to manipulate the numeral keys until the carriage reaches a certain point without releasing the motor, thereby not affecting the numeral wheels which are adding the sums set down in the tabulated columns at the right hand side of the sheet.

We will now proceed to give the general operation of the parts during an addition. For instance, we will suppose that the operator is making out a statement and tabulating the figures at the right hand side of the sheet in the usual manner, and we will suppose that he is about to write the sum $580.91. He depresses the tabulator key 9 under the symbol 10,000 to position the carriages. As the first figure of the sum to be added is in the ten thousands column, the third to the left of the decimal point, it is obvious that the ten thousands numeral wheel or third wheel from the decimal space, must be moved into engagement with the motor drive wheel 72, therefore when the tabulator key is depressed to position the carriage 4, the tabulator stop lever 16 which is connected to the tabulator stop lever 6 depressed by the said key, will be swung outward at its lower end, causing its upper end to be projected forward through the guide plate 20 and into the path of the counter carriage 25. When the tabulator key 9 is depressed and the typewriter carriage 4 released, the bar 42 rides off the end of the lever 45, thus allowing the spring 46 to swing the lug $45^b$ out of engagement with the leaf spring 47, thus releasing the carriage. Simultaneously with this movement, the bridle 40 is swung outward rocking on its arm 39, which depresses the bell crank lever 37 (see Fig. 14). The upper end of the bell crank lever being swung inward, moves the shaft 34 longitudinally, thus moving the escapement 31 bodily out of line and engagement with the escapement bar 30. These movements being completed, the counter carriage is drawn by the tape 27 along the rail 24 until it abuts the end of the stop lever 6 which has been projected into its path, thus coming to rest with its ten thousands wheel in mesh with the teeth 71 of the motor drive wheel 72. The peculiar construction of the teeth on the numeral wheels and the teeth 71, allow the first two wheels encountered to pass through the teeth of the motor drive wheel. Pressure being relieved on the tabulator key, the stop levers are returned to their normal positions and the bridle swung downward to its normal position by its spring 41, thus allowing the spring 35 to draw the escapement 31 into engagement with the escapement bar 30 and thus lock the counter carriage in position. The carriages being thus positioned, the operator depresses the typewriter key bearing the numeral 5, thus printing the numeral 5 on the sheet in its proper place and at the same time rocking the shaft 54. The rocking of the shaft 54 causes its cam 99 to be swung downward and to ride against the stop bar $A^5$, which is moved laterally, so that its stop $B^5$ is projected into the path of the swinging stop arm 91. The rocking of the shaft 54 also through its arm 58 and pin 59, slides the frame 55 which swings the lever 60 by means of the pin 61.

The lever 60 on being swung, draws the bolt 96 downward out of engagement with the teeth of the locking ring 88 and simultaneously swings the lever 95 downward. The lever 95 being connected to the release plate 92, draws the same downward so that the seat $92^c$ (see Fig. 5) is moved from about the pin $94^a$. This leaves the pin $94^a$ free to travel in the slot $92^b$ so that the motor spring 75 is free to revolve the drive wheel 72 and swing the stop arm 91 through the agency of the dog 94 and the ratchet wheel 90. The motor will revolve until the lower end of the arm 91 contacts with the underside of the stop $B^5$ which has been projected into its path. This revolution of the motor drive wheel is sufficient to revolve the ten thousands numeral wheel with which it is in engagement, five digits or figures. The operator now relieving the pressure on the numeral 5 key of the typewriter, the spring $99^a$ connected to the stop bar $A^5$, returns the same to its normal position, while the spring 62 serves to slide the frame 55 to its normal position through the medium of the pin 61 and the lever 60 which is likewise returned. The return movement of the lever 60 throws the lock bolt 96 up into engagement with the locking ring 88 and at the same time swings the lever 95 upward, which in turn moves the release plate 92 upward. The upward movement of the release plate by means of the pin $94^a$ raises the dog 94 out of engagement with the teeth of the ratchet 90. Upon this movement, the spring 93 which has been twisted or wound by the swinging of the stop arm unwinds and swings the arm back to its normal position, the pin $94^a$ dropping into the seat $92^c$ and allowing the dog 94 to again engage with the teeth of the ratchet 90. When the frame 55 is returned by the spring 52, its lug 56 engaging with the pin 51 of the crank shaft 50, swings the latter so that the arm 49 is swung downward causing the arm 36 to also be swung downward by means of the link 48. This movement of the arm 36 rocks the escapement 31 so that the counter carriage is allowed to move two steps or two teeth of the escapement bar 30, thus bringing the next lowest numeral wheel or thousands wheel into mesh with the motor drive wheel. The operator now depresses the numeral 8 key, which it will be observed is on the opposite side of the typewriter. The depression of the numeral 8 key, causes a similar operation of the parts as the depression of the numeral 5 key, except as to the stop bar. The depression of the numeral 8 key rocks the shaft 54 connected thereto, which through its cam 101 swings the lower end of the stop bar $C^8$ downward, thereby projecting its top $D^8$ at its upper end into the path of the stop arm 91. The stop $B^8$ being higher up in the bank of stops and farther away from the starting point of the stop arm, the latter is allowed to swing further when released, thereby permitting a longer revolution of the drive wheel or a sufficient movement to revolve the thousands wheel 8 digits or figure 8. The pressure being relieved on the numerals key, the parts return to their normal positions, as in the case of the numeral 5 key. The next symbol being zero, it will be apparent that no movement of the hundreds wheel is required. The counter carriage having been moved so that its hundreds wheel is in mesh with the drive wheel in the manner above described, the operator now depresses the zero or O key, which rocks its shaft 54. The shaft 54 being connected neither with the stops nor the frame 55, the same remain inoperative, but the arm 53 on the shaft is swung upward so that the loop 52 (see Fig. 7) swings the crank shaft 50 by means of the pin 51 to operate the escapement 31 and allow the counter carriage to move two spaces so as to bring the tens wheel into mesh with the motor drive wheel, the spacing of the teeth on the escapement bar permitting the counter carriage to move over the decimal space. The operator now depresses the key 9 which through its rock shaft 54 moves the frame 55 to release the motor and the swinging stop arm. As hereinbefore described the fixed stop is employed when 9 is added, therefore the arm 91 is allowed to swing and the motor revolved until the arm engages with the stop 102, the movement of the motor serving to revolve the tens wheel 9 figures or digits, thus adding 9. Pressure being relieved on the numeral 9 key, the parts are returned to their normal positions and the counter carriage moved two spaces so as to bring the units wheel into mesh with the teeth of the motor drive wheel. The operator now depresses the numeral 1 key, which through the rocking of its shaft 54 causes its cam 104 and lug 59ª to be swung, the cam 104 swinging the stop bar E² so that its stop E¹ is projected into the path of the stop arm 91 and the lug 59ª moving the frame 55 as in the case of the other keys, so that the motor and arm are released and the arm swung until it encounters the stop E¹, the movement being sufficient to permit the drive wheel of the motor to revolve the units wheel one figure or digit and thus register or add 1. The pressure being relieved on the numeral wheel 1, the parts return to their normal positions as before. The sum having been added, the operator returns the typewriter carriage 4 to its starting point. As the typewriter carriage is returned the headed pin 44 engages with the counter carriage and moves the same to its starting point. The return movement of the typewriter carriage 4 also performs two other functions, that of moving the lug 45ᵇ upward so as to be engaged by the teeth of the spring 47 to lock the counter carriage against movement and that of releasing the bell crank locking lever 106, so that the lower end of the same engages with the locking ring 88 to lock the motor against operation.

For the purpose of locking the parts against operation, so that the numeral keys of the typewriter may be freely manipulated without operating the registering device or the other parts of our attachment, we provide an irregular shaped handle lever 110 having its handle portion projecting beyond the bracket 22 so as to be readily manipulated by the operator as shown in Fig. 3. The lever 110 is pivotally mounted on a screw 111 fastened to the rear side of the bracket 23 and is provided with an angular extension 112 projecting under the bracket 23 and a vertical extension 113 having its upper end terminating in close proximity to the underside of the locking ring 88. The lever has a slotted portion at its intersection with the vertical extension; a screw 115ª (see Fig. 7) passed through the slotted portion and driven into the bracket 23 serves to limit the movement of the lever. The lever also engages with the downwardly inclined end of a cam finger 115 projecting downwardly from the lever 45 as best shown in Fig. 1. When it is desired to lock the parts, the lever 110 is swung downward. As the lever is swung downward it rides along the inclined end of the cam finger 115 forcing the same outward, which causes the lever 45 to be swung upward and its lug 45ᵇ also moved upward and held so as to fasten the counter carriage irrespective of the movements of the typewriter carriage. At the same time the vertical extension 113 is swung into the locking ring 88, thus locking the motor against movement and simultaneously the angular extension 112 is swung to the right, reference being had to Fig. 7. The extension 112 projecting in close proximity to the lug 56 when swung to the right engages with the said lug and moves the frame 55 to the right so that the lugs 57 of the latter are swung out of the path of the pins 59 of the arm 58, thus leaving the rock shafts 54 free to rock without moving the frame 55 and also relieving them from the tension of the spring 62, which it will be understood must be overcome every time the frame 55 is moved. Upon swinging the lever 110 upward, the parts are unlocked and free to operate in their usual manner.

Although we have illustrated and described our attachment as applied to a typewriter, we wish it understood that the same may be used in connection with various key operated machines such as registers and calculating devices.

Having now fully described our invention, what we claim and desire to secure by Letters Patent is:

1. The combination with a key operated machine and the traveling carriage thereof, of a separably mounted traveling registering device, means for imparting movement to the registering device, means for holding the registering device against movement and permitting the carriage to travel, and means for operating said holding means for releasing the registering device.

2. The combination with a key operated machine, of a traveling registering device, a retaining device adapted to engage with the registering device, means for positioning the registering device, and means operated by the positioning means for moving the retaining device out of engagement with the registering device to release the same.

3. The combination with a key operated machine and the traveling carriage thereof, of a traveling registering device separately mounted from the carriage and normally held against movement, means for releasing the traveling registering device, means independent of the traveling carriage for traversing the registering device, and means carried by the carriage for returning the registering device to its normal position.

4. The combination with a key operated machine, and the traveling carriage thereof, of a traveling registering device, means for locking the registering device against movement, and a projection mounted on the carriage of the machine adapted to engage the locking means to throw it into locking relation with the traveling device and to disengage with the locking means to allow it to be thrown out of locking relation with the traveling device to release the same.

5. In a key operated machine, a traveling registering device, means for traversing the registering device, a device for holding the registering device against travel, key operated means for operating said device to allow the registering device to move step by step, means for bodily moving said device out of engagement with the registering device to permit the same to travel freely, and stops for arresting the registering device at predetermined points of its travel, said stops also having connection with the means for bodily moving the holding device out of engagement with the registering device for operating the said means.

6. In a key-operated machine, a traveling registering device, spring mechanism for traversing the registering device, an escapement adapted to hold the registering device against movement to impart a step by step movement to the same, key operated means having connection with the escapement for operating the same, a pivotally mounted device having connection with the escapement for moving the same out of engagement with the registering device, and means having connection with the pivoted means for swinging the same and stopping the registering device at predetermined points of its travel.

7. The combination with a key operated machine and the traveling carriage thereof, of a registering device, a spring motor for operating the registering device, means operated by the carriage of the machine for winding the motor, and means for automatically throwing the winding means out of operative relation with the motor.

8. The combination with a key operated machine and the traveling carriage thereof, of a registering device, a spring motor for operating the registering device, means operated by the carriage of the machine for winding the motor, and means for automatically throwing the winding means into operative relation with the motor.

9. The combination with a key operated machine and the traveling carriage thereof, of a registering device, a spring motor for operating the registering device, means operated by the carriage of the machine for winding the motor, and means for automatically throwing the winding means into and out of operative relation with the motor.

10. In a calculating machine, a traveling registering device, a motor for operating the registering device, means for traversing the registering device, and means for controlling the motor, in combination with means for simultaneously locking the traveling registering device and the motor against movement.

11. In a calculating device, the combination with a registering device, of a spring motor, means for releasing the motor to allow it to revolve in one direction to operate the registering device, means for limiting the revolution of the motor, and means for imparting a slight reverse movement to the motor.

12. In a calculating device, the combination with a registering device, of a spring motor arranged to operate the registering device and slightly overthrow the same, and means engaging with the motor to impart a slight reverse movement thereto to offset the overthrow.

13. In a calculating device, the combination with a registering device comprising a plurality of counting wheels, of a spring motor having a master wheel which is successively engaged by the counting wheels and which operates said counting wheels, a swinging device connected to and swung in one direction by the motor, key-operated stops for resetting the swinging device to limit the revolution of the master wheel, and means for returning the swinging device to its normal position.

14. The combination with a key operated machine and the traveling carriage thereof, of a registering device, a motor for operating the registering device, means for locking the motor against operation, and means carried by the carriage for moving the locking means out of locking relation with the motor.

15. The combination with a key operated machine, the traveling carriage thereof and a registering device, of a motor comprising a master wheel arranged to be engaged by the registering device for operating the same, and operating spring associated with the master wheel, a winding member connected to the spring, a winding device adapted to be engaged with the winding member, means for moving the winding device into and out of engagement with the winding member, means operated by the winding member for operating the moving means to throw the winding device out of engagement with the winding member, and means for overcoming the power of the operating spring when the same is unwound to a certain degree and throwing the winding device into engagement with the winding member.

16. In a calculating machine, a traveling registering device, a motor for operating the registering device, and key operated means for controlling the motor, in combination with means for simultaneously locking the traveling registering device and the motor against operation and also moving and holding the key operated means out of operative relation with its parts.

17. In a calculating device, the combination with a registering device, of a spring motor adapted to operate the registering device, a swinging stop device, a movable connection between the motor and the swinging device, and a releasing device engaging with the connection and normally holding the swinging device and motor against movement but arranged to release the motor and swinging device when moved.

18. In a calculating device, the combination with a registering device, of a spring motor adapted to operate the registering device, a swinging stop device, a movable connection between the motor and the swinging device, a releasing device engaging with the connection and normally holding the swinging device and motor against movement but arranged to release the motor and swinging device when moved, the said releasing device adapted to move the movable connection out of engagement with the motor when returned to its normal position, and means for returning the swinging device to its normal position and causing the movable connection to again engage with the motor.

In testimony whereof we affix our signatures in presence of two witnesses.

HARRY C. DUNGAN.
JAMES M. HUCKINS.

Witnesses:
C. C. SHEPHERD,
M. B. SCHLEY.